(12) United States Patent
Craven-Bartle

(10) Patent No.: US 6,927,916 B2
(45) Date of Patent: Aug. 9, 2005

(54) ILLUMINATION AND IMAGING OF AN OBJECT

(75) Inventor: Thomas Craven-Bartle, Lund (SE)

(73) Assignee: Anoto AB, Lund (SE)

( * ) Notice: Subject to any disclaimer, the term of this patent is extended or adjusted under 35 U.S.C. 154(b) by 332 days.

(21) Appl. No.: 10/251,801

(22) Filed: Sep. 23, 2002

(65) Prior Publication Data

US 2003/0075673 A1 Apr. 24, 2003

Related U.S. Application Data

(60) Provisional application No. 60/325,169, filed on Sep. 29, 2001.

(30) Foreign Application Priority Data

Sep. 21, 2001 (SE) .............................. 0103152

(51) Int. Cl.$^7$ .............................................. G02B 27/10
(52) U.S. Cl. ..................................... 359/618; 359/798
(58) Field of Search ................................ 359/618, 629, 359/738–740, 798, 636, 638–640

(56) References Cited

U.S. PATENT DOCUMENTS 5,126,872 A * 6/1992 Birkle ........................ 359/196
5,719,672 A * 2/1998 Chien ........................ 356/328
6,084,703 A   7/2000 Dewald
6,114,712 A   9/2000 Dvorkis et al.

FOREIGN PATENT DOCUMENTS

| DE | 4035077 A1 | 5/1992 |
| GB | 2166831 A | 5/1986 |
| WO | WO 00/72287 A1 | 11/2000 |
| WO | WO 01/30589 A1 | 5/2001 |
| WO | WO 01/71654 A1 | 9/2001 |

* cited by examiner

Primary Examiner—Ricky Mack
(74) Attorney, Agent, or Firm—Birch, Stewart, Kolasch & Birch, LLP

(57) ABSTRACT

An optical system, for example in an optical pen, is arranged to illuminate an object plane and to transmit an image of the object plane to an image plane. The system has an optical component that reflects first radiation, which is emitted by a radiation source, towards the object plane while also transmitting second radiation from the object plane towards the image plane. The optical component comprises a reflective surface portion arranged to reflect the first radiation, and a spatially separate transparent surface portion arranged to transmit the second radiation.

56 Claims, 5 Drawing Sheets

ILLUMINATION AND IMAGING OF AN OBJECT

This application claims priority on provisional Application No. 60/325,169 filed on Sep. 29, 2001, the entire contents of which are hereby incorporated by reference.

FIELD OF THE INVENTION

The present invention relates to an optical system arranged to illuminate an object plane and to transmit an image of the object plane to an image plane. The invention also relates to an optical component for such a system, a handheld user unit and a method for illuminating an object plane and capturing an image thereof.

BACKGROUND ART

Optical systems of the above type are used in a large number of devices, for example handheld devices with imaging capability, such as handheld scanners and optical pens. In such devices, it is important for the optical system and the optical components included to be made as compact as possible so as to keep the total size down. For an optical system used in an optical pen, the relevant object has usually an extent of less than one centimeter, and the image formed by the imaging optics is usually within a surface of a few square millimeters. Such an optical pen is disclosed in WO 01/71654, which is incorporated herein by reference. Of course, other dimensions of the optical system may be involved for other types of devices.

The optical system typically includes imaging optics, a radiation source and a radiation sensor. For reasons of production, it is important that the components included in the optical system can be mounted in a manner which is as simple, robust and space-efficient as possible. In handheld devices, it is common to mount the imaging optics and the sensor side by side with the radiation source, which results in separate illumination and imaging paths. Such mounting, however, requires a great deal of space in the handheld device.

A typical requirement placed on optical systems in handheld devices is that they must be able to adequately image objects at different distances. This means that the system should have a sufficiently large depth of field, which calls for a high f-number of the system and, thus, a relatively small aperture stop. Such a system will permit relatively little radiation to reach the image plane from the illuminated object plane. The object plane must therefore be exposed to a high intensity of illuminating radiation.

Further, in optical systems with separate illumination and imaging paths, the illuminated area and the imaged area in the object plane can only be brought to coincide for a given nominal object distance. Whenever there is a need to accommodate for various object distances within the depth of field, it is necessary to illuminate a considerably larger object plane area than the one that is to be imaged at the nominal object distance. Thus, the radiation from the radiation source is used inefficiently, which further accentuates the need for a powerful radiation source.

Such a powerful radiation source may exhibit several drawbacks, such as being expensive, non-durable, power-consuming and bulky.

The above problems may also be present in optical systems with partly overlapping illumination and imaging paths. WO 00/72287 discloses an optical pen with such an optical system, in which a beam splitter is arranged to reflect radiation from a radiation source onto an object plane and to transmit any retro-reflected radiation from the object plane to imaging optics that forms an image of the illuminated object plane on a sensor. Such a system makes inefficient use of the available radiation, since every interaction with the beam splitter results in a considerable loss of radiation. Typically 50% of the incident radiation from the radiation source is transmitted by the beam splitter instead of being reflected towards the object plane, and typically another 50% of the retro-reflected radiation is reflected by the beam splitter instead of being transmitted to the sensor. Further, any such transmission of the incident radiation from the presumably powerful radiation source is likely to produce significant background radiation which might interfere with the transmitted retro-reflected radiation that forms the image signal on the sensor. Additionally, the beam splitter is a potentially expensive component, in particular if it should exhibit controlled surface and transmission properties.

A similar optical arrangement is disclosed in GB-A-2 166 831.

The prior art also comprises U.S. Pat. No. 6,114,712 which discloses a handheld scanner with yet another form of optical system with partly overlapping illumination and imaging paths.

SUMMARY OF THE INVENTION

One object of the present invention is to allow simple, robust and space-efficient mounting of the parts included in an optical system, and to enable more efficient utilization of the radiation from a radiation source in the system.

According to the invention, the object is fully or at least partly achieved by the optical system according to claims 1 and 30, the optical component according to claims 31, 40 and 41, the handheld user unit according to claim 54, and the method according to claim 55. Preferred embodiments of the invention are defined in the dependent claims.

According to one aspect of the invention, it relates to an optical system arranged to illuminate an object plane and to transmit an image of the object plane to an image plane, said system comprising an optical component that reflects first radiation, which is emitted by a radiation source, towards the object plane while also transmitting second radiation from the object plane towards the image plane, wherein the optical component comprises a reflective surface portion arranged to reflect the first radiation and a spatially separate transparent surface portion arranged to transmit the second radiation.

Such an optical system allows for partially overlapping illumination and imaging paths, and can thus be made compact. In such a system it is possible, as explained above, to accomplish coincident illuminated and imaged areas in the object plane, for all object distances within the depth of field. In other words, the optical component can be arranged to reflect the first radiation essentially concentric with the optical axis of the optical system to illuminate the object plane, the optical axis being defined by the travel path of the second radiation from the object plane to the image plane.

Further, the optical system allows for efficient use of the available radiation, in that reflection of the first radiation from the radiation source can be effected separately from transmission of second radiation from the object plane. The reflective surface portion can thus be optimized for reflection of the first radiation, whereas the transparent surface portion can be optimized for transmission of the second radiation. Thus, the optical system according to the invention has the potential of reducing manufacturing costs by allowing for the use of a less powerful radiation source and/or of producing a stronger image signal in the image plane.

The spatial separation of the reflective and transparent surface portions may also minimize the amount of background radiation that reaches the image plane, again as it allows for separate optimization of the reflective surface portion and transparent surface portion. For this reason, the reflective surface portion is suitably essentially totally reflective to the first radiation as well as the second radiation.

The optical system is also rendered simple and robust by the reflective and transparent surface portions being incorporated in one and the same optical component.

The reflective surface portion may be arranged in surrounding relationship to the transparent surface portion. In such an embodiment, the reflective surface portion may thus define the extent of the transparent surface portion.

The optical component may be arranged with the transparent surface portion serving as a stop in the optical system. Thereby, the number of separate parts in the system may be reduced. This may also reduce the tolerances of the optical system. An optical pen, for example, may have a compact optical system with several small or minute optical elements, and it may be difficult to manufacture and install such elements with the required precision. By incorporating the stop in the optical component, the manufacture and installation of the stop may be facilitated. This may be particularly true for the aperture stop which determines the depth of field of the system, since such a stop may have a diameter in the order of 0.5–1.0 mm in, for example, an optical pen.

Furthermore, the transparent surface portion can be arranged to be screened from the first radiation from the radiation source, so as to minimize the amount of first radiation reaching the image plane. This may be accomplished by positioning the transparent surface portion in a plane which is essentially parallel to the main direction of the first radiation from the radiation source. Such an arrangement of the transparent surface portion may be convenient in terms of manufacture, for example in a molding or grinding step. Furthermore, the plane of the transparent surface portion may be arranged essentially perpendicular to the optical axis of the system.

It may also be advantageous to arrange the transparent surface portion to include an intersection between the optical axis of the system and the main direction of the first radiation.

In one embodiment, the reflective surface portion of the optical component may comprise two reflective roof faces which intersect in a trench line to form a reflective roof section. The transparent surface portion may be formed in the reflective roof section along and around the trench line.

The reflective surface portion may further comprise two secondary reflective roof faces which intersect in a ridge to form part of the reflective roof section, the ridge being essentially aligned with the trench line and a transition between the trench line and the ridge defining the transparent surface portion. In such an embodiment, essentially all incident first radiation can be reflected towards the object plane, with only limited influence on the beam profile of the incident first radiation.

In one embodiment, the optical system may comprise a light guide, which may be incorporated as part of the optical component. Such a light guide may be arranged to collect the first radiation from the radiation source, so that the radiation source can/be arranged at a larger distance from the reflective surface portion without deteriorating the function of the optical system. The light guide may have the additional function of achieving a controlled modification of the beam profile of the incident first radiation.

The optical system may, alternatively or additionally, comprise a light guide which is arranged to receive the first radiation from the reflective surface portion. Such a light guide may be incorporated as part of the optical component. The light guide may result in increased degree of freedom in the placement of the object plane with respect to the reflective surface portion. The light guide may further be used to achieve a controlled modification of the beam profile of the first radiation that enters the light guide.

In one embodiment, the optical component is in the shape of a shell, Such a configuration may reduce any uncontrolled retro-reflection of first radiation into the transparent surface portion, by eliminating any step-changes in refractive index in the radiation path from the reflective surface portion to the object plane. Another advantage may be a reduction in weight of the optical system.

The shell-shaped optical component may suitably be coated with or manufactured in a reflecting material. Such a component is relatively insensitive to any dirt or particles being deposited on the reflective surface portion.

In another embodiment, the optical component is a prism. Here, the reflective surface portion may be formed by reflective surfaces that are mutually arranged to provide total internal reflection of the incident first and second radiation. Alternatively or additionally, at least part of the reflective surface portion may be coated with a reflecting material.

The prism may be simple to manufacture since only a few manufacturing steps are required to obtain the given relationships between the reflective surfaces. Manufacture may also be simplified by the fact that the prism may not have to be coated with a reflecting material. A prism is also relatively robust. In other embodiments, the reflective surface portion of the prism may be coated with a reflecting material, which gives the advantage of providing a component which is even less sensitive to deposition of dirt or particles, and reduces the risk of any first radiation leaking out of the optical component towards the image plane.

The system may comprise a refractive surface which is arranged to receive the first radiation from the reflective surface portion. This refractive surface, which may be incorporated as part of the optical component, may be a lens surface which may be inclined relative to the optical axis of the system and adapted to prevent any retro-reflection of the first radiation into the transparent surface portion.

Irrespective of whether the optical component is a prism or a shell, the transparent surface portion may include a refractive surface, such as an imaging lens surface arranged to receive the second radiation from the object plane. This may facilitate the assembly of the optical system as well as reduce the tolerances of the optical system, since the refractive surface may be precisely positioned with respect to the reflective and transparent surface portions. Further, the number of degrees of freedom in the system is increased, making it possible to dispense with one or more other refractive surfaces in the system.

In one embodiment, the image path is bent so that the image plane is arranged essentially level with the radiation source. Such a design may facilitate the assembly and mounting of the optical system. For example, the optical system may be interfaced with a flat printed-circuit board, on which the radiation source and a two-dimensional radiation detector are mounted.

According to other aspects, the invention relates to the optical component itself, and a handheld user unit with the optical system or the optical component. Embodiments thereof, and corresponding advantages, may be inferred from the above discussion about the optical system.

According to a further aspect of the invention, it relates to a method for illuminating an object plane and capturing an image thereof, comprising: activating a radiation source to generate radiation, receiving at least part of the generated radiation on a stationary reflective surface portion and redirecting it by reflection towards the object plane, and collecting second radiation from the object plane to form an image in an image plane, wherein the second radiation is collected through a transparent surface portion which is physically connected to, but spatially separate from, the reflective surface portion.

Embodiments of this method, and corresponding advantages, may be inferred from the above discussion about the optical system.

BRIEF DESCRIPTION OF THE DRAWINGS

The invention will now be described in more detail with reference to the accompanying schematic drawings which by way of example illustrate currently preferred embodiments of the invention.

DESCRIPTION OF PREFERRED EMBODIMENTS

Figure 1:
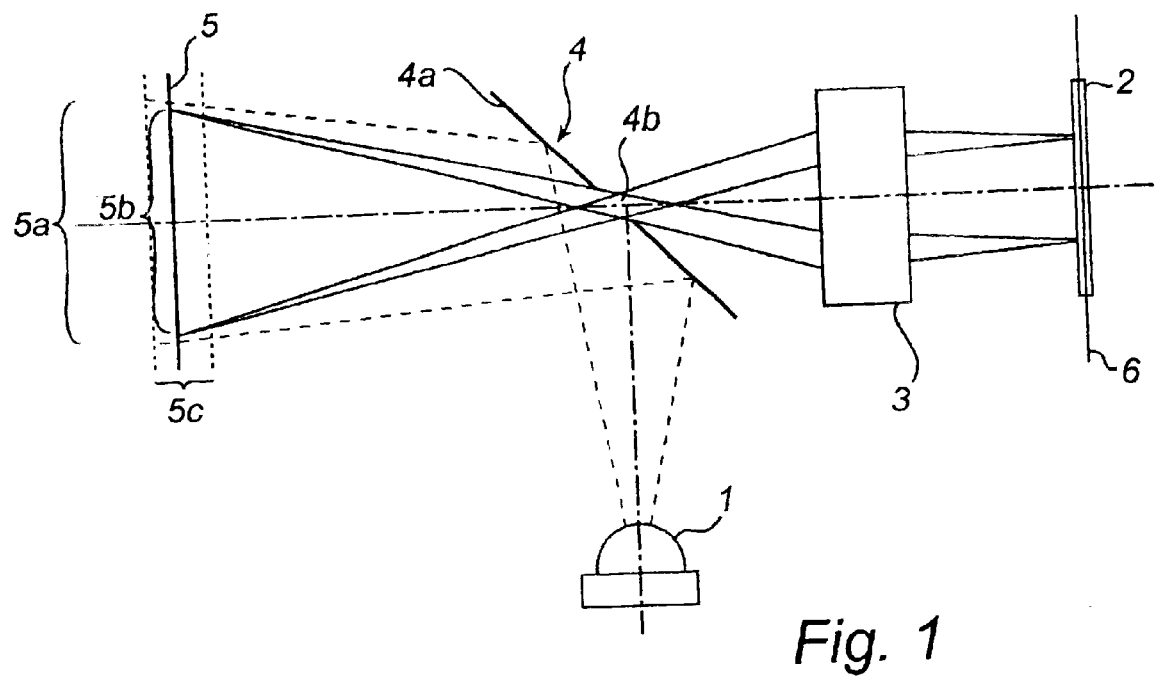
FIG. 1 is a side view of the radiation paths within an optical system according to the invention.

FIG. 1 shows the general arrangement of an optical system according to the invention. The optical system includes a radiation source 1, a radiation sensor 2, imaging optics 3, and a dual-path component 4. The source 1 emits radiation (indicated by dashed lines in FIG. 1) which is directed to illuminate an area 5a in an object plane 5. The imaging optics 3 collects radiation (indicated by full lines in FIG. 1) within its field of view 5b in the object plane 5 and forms an image of the object plane in an image plane 6, where it is captured by the sensor 2.

Normally, the image is formed from radiation that is reflected off any object present within the depth of field 5c of the optical system. Such reflected radiation may be a combination of radiation from the source 1 and other ambient radiation. The source 1 may be emitting radiation continuously or intermittently. In the latter case, the activation of the source 1 and the exposure of the sensor 2 are suitably synchronized temporally.

The source 1 may be any form of radiation-generating element(s), such as one or more laser diodes, one or more filament lamps, one or more discharge lamps, one or more light-emitting diodes etc. The sensor 2 may be any form of radiation-sensitive device, such as photographic film or an electronic detector, for example a solid state area detector such as a CCD or CMOS detector. The imaging optics 3 may include one or more refractive elements, such as optical lenses, one or more mirrors or prisms, and one or more stops, such as an aperture stop, a field stop, etc.

The dual-path component 4 is arranged to merge an illumination path and an imaging path of the system to extend between the dual-path component 4 and the object plane 5. To this end, the dual-path component 4 comprises a mirror surface 4a and a separate transparent window 4b. The mirror surface 4a is arranged to reflect essentially all incident radiation from the source 1, typically a divergent beam, towards the object plane 5. Furthermore, any radiation that falls on the mirror surface 4a from the object plane 5 is also blocked by reflection. The transparent window 4b is arranged to transmit radiation which is collected from the object plane 5 by means of the imaging optics 3.

FIG. 1 also includes an optical axis of the system, illustrated as a horizontal chain line. This axis is defined as a line following a ray from the center of the field of view 5b, through the optical system via the center of the transparent window 4b, to the center of the image on the sensor 2.

The dual-path component 4 of FIG. 1 allows for efficient utilization of the available radiation, since essentially all incident radiation may be delivered to the illuminated area 5a. If desired, the illuminated area 5a and the field of view 5b can be brought to essentially coincide over the entire depth of field 5c of the optical system, as illustrated in FIG. 1, so as to maximize the utilization of the available radiation.

Further, the dual-path component of FIG. 1 allows for efficient collection of radiation from the object plane 5, since such radiation may be collected with minimum losses through the transparent window 4b.

Still further, the dual-path component of FIG. 1 generally allows the transparent window 4b to form the aperture stop of the optical system. This may be advantageous with respect to both manufacture and assembly of the optical system, especially in systems with a large depth of field and, thus, a minute aperture stop.

If the source 1 emits a divergent beam of radiation, the source might be placed slightly off-center with respect to the mirror surface 4a, so that the entire beam hits the mirror surface 4a. This is illustrated in FIG. 1, where the symmetry line of the source beam (shown as a vertical chain line) is displaced from the center of the transparent window 4b at the center of the mirror surface 4a such that that the source beam illuminates the mirror surface 4a symmetrically around the transparent window 4b.

In specific implementations of the above-described optical system, it might be desirable to further optimize the illumination of the object plane 5, as well as to minimize any leakage of incident radiation through the transparent window 4b. FIGS. 2–10 show different embodiments that fully or partly fulfill such needs. In all drawings, corresponding elements have the same reference numerals.

Figure 2:
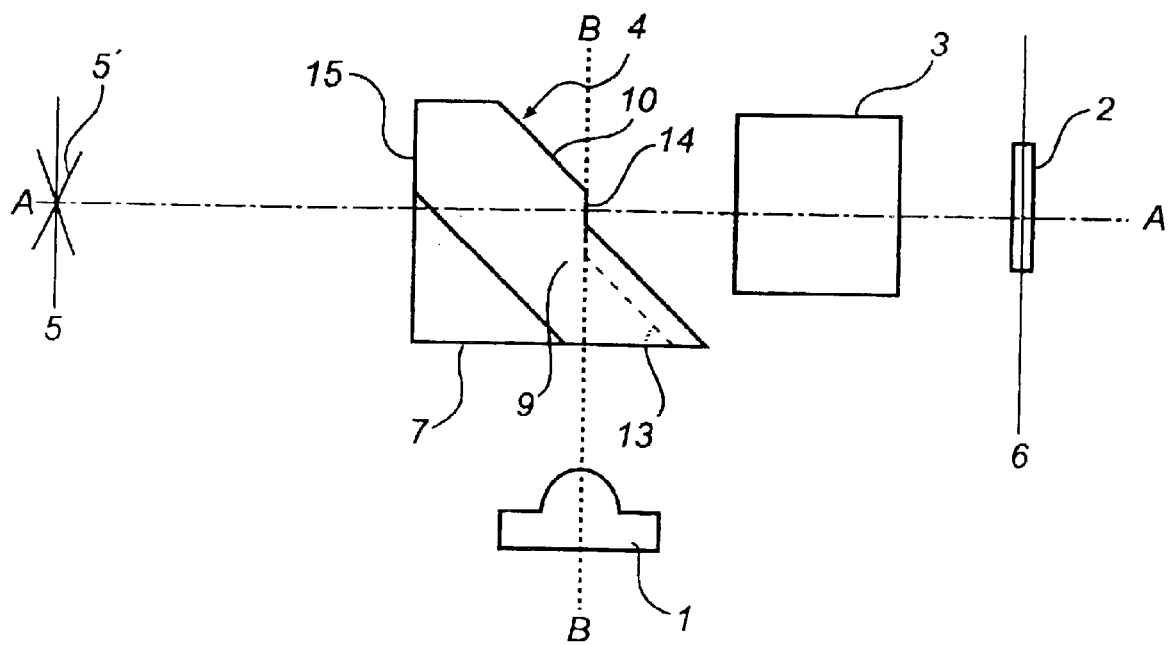
FIG. 2 is a side view of an embodiment of an optical system according to the invention.

In FIG. 2, the optical system comprises a source 1 in the form of a light-emitting diode (LED), a sensor 2, imaging optics 3 and a dual-path component 4 in the form of a modified Amici prism. An Amici prism is a right-angled prism which has been provided with a roof edge in one of its surfaces. A right-angled prism or some other type of prism which is provided with a roof edge in this manner is usually referred to as a roof prism.

Figure 4:
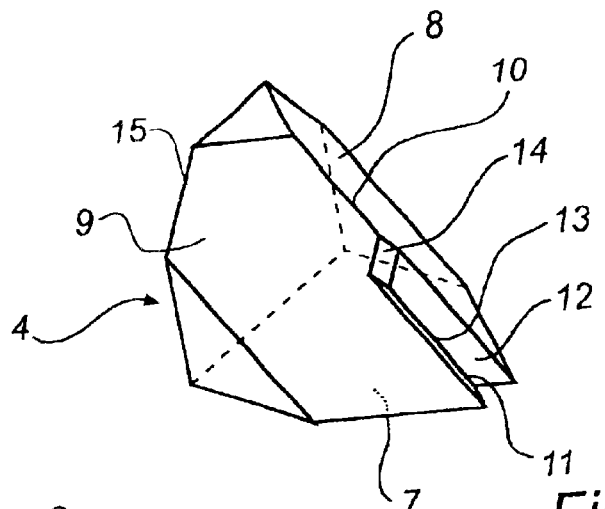
FIG. 4 is a perspective view of an embodiment of an optical component included in the system in FIGS. 2–3.

The prism 4, which is shown in tore detail in FIG. 4, has an illumination side 7, which is arranged to face the source 1, and two roof faces 8, 9. The two root faces 8, 9 are mutually inclined and intersect each other along an elongate ridge 10. In this ridge 10 an elongate recess is made, which forms two secondary root faces 11, 12 which intersect each other in an inverted ridge 13. The transition between the ridges 10, 13 forms a rhombic area 14 which acts as the aperture stop of the optical system. The prism 4 also has an object side 15, which in the optical system faces the, object plane 5. Referring back to FIG. 1, the root faces 8, 9, 11, 12 correspond to the mirror surface 4a, whereas the rhombic area 14 corresponds to the transparent window 4b.

The parts included in the system are arranged relative to each other in such manner that the ray path through the system is such that rays of radiation from the source 1 fall into the dual-path component 4 through the illumination side 7 and are reflected in one or some of the roof faces 8, 9, 11 or 12 and pass through the object side 15 and illuminate the object plane 5. Then rays of radiation project from the object plane 5 back through the dual-path component 4 through the aperture 14 and pass the imaging optics 3 and fall on the sensor 2 which is located in the image plane 6. The imaging optics 3 comprises one or more lenses or other optical components which are arranged to direct the rays so that an image of the object is created on the sensor 2.

As viewed from the illumination side 7 and the object side 15, the roof faces 8, 9, 11, 12 form a reflective roof section which is angled at 45° to the illumination and object sides 7, 15. The roof faces 8, 9 intersect to form a wedge-shaped elongate trench along the line 10. The roof faces 9, 11 and 8, 12 intersect to form a respective elongate wedge-shape secondary trench, whereas the secondary roof faces 11, 12 intersect to form an elongate ridge 13. The roof faces 8, 9, 11 and 12 are angled so as to give total internal reflection of all rays received from the source 1, which causes radiation to project merely from the component 4 through its object side 15. Correspondingly, the roof faces give total internal reflection of all rays received from an object 5' in the object plane 5. In FIGS. 2 and 4, the root faces 8, 9; 8, 12; 9, 11; 11, 12 all intersect at right angles. The rhombic area 14 is formed as a planar area at the transition from the trench to the ridge.

The rhombic area 14 is arranged to be screened from the rays emitted by the source 1, and yet to be transparent to rays emitted within the field of view 5b in the object plane 5 (FIG. 1). In FIG. 2, the area 14 is arranged parallel to the main direction of radiation from the source 1, as illustrated by the dotted line B. In another embodiment (not shown), the area 14 is slightly tilted away from the source 1.

Figure 3:
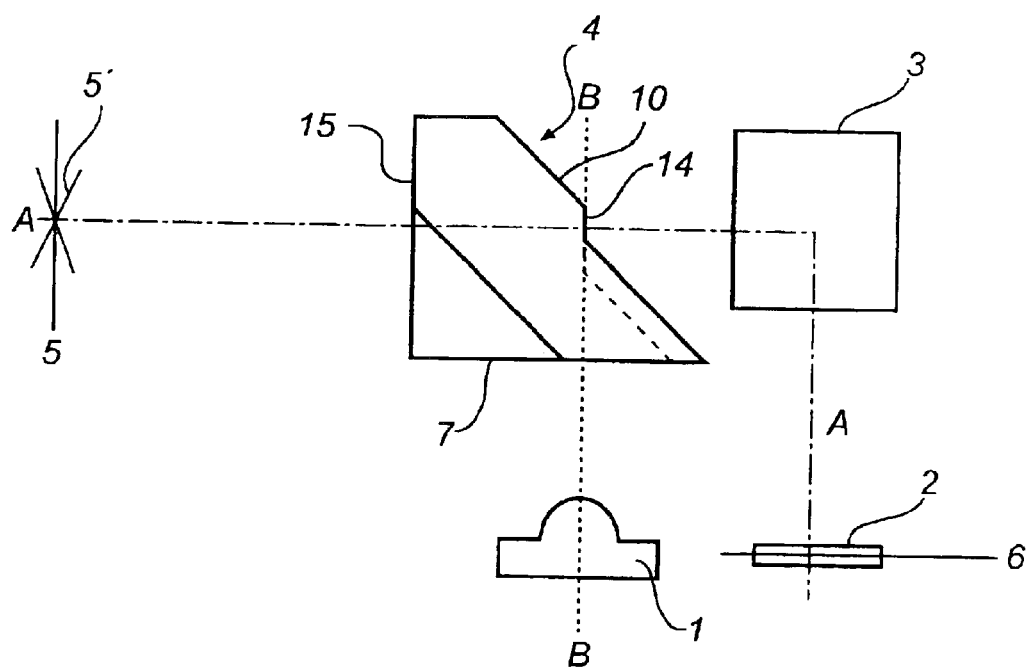
FIG. 3 is a side view of an alternative arrangement of the embodiment in FIG. 2.

FIG. 3 illustrates an alternative arrangement of the optical system of FIG. 2. The imaging optics 3 is here arranged to redirect the rays when they have passed the area 14 in such manner that they fall on the sensor 2 which is placed essentially in the same plane as the source 1. The imaging optics 3 comprises in this embodiment a prism or a mirror inclined to the optical axis and reflecting rays towards the sensor 2. The optical system according to this arrangement can easily be built on a printed circuit board mounting the sensor 2 and the source 1.

It should be noted that the angles of intersection between the roof faces 8, 9, 11, 12 may deviate from 90°. In some cases, angles in the range of about 45–135° may be used without losing the dual-path component's 4 function of totally reflecting radiation from the source 1 towards the object plane 5. The angles of intersection may for example be selected to attain a desired shape of the area 14, for example rectangular. Some or all of the roof faces 8, 9, 11, 12 may furthermore be coated with a reflecting material, for example metal such as aluminum, silver or gold, or a dielectric.

Figure 5:
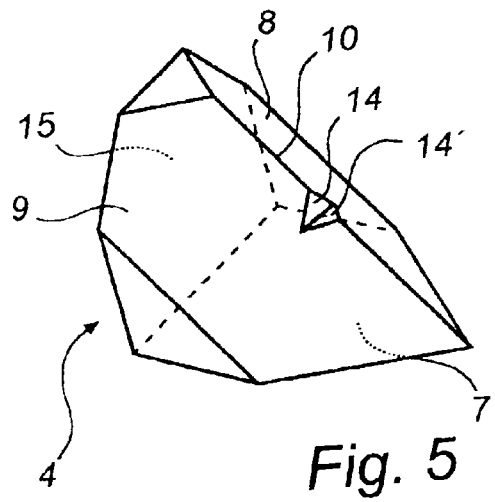
FIG. 5 is a perspective view of a first alternative embodiment of the optical component in FIG. 4.

According to a first alternative embodiment as shown in FIG. 5, the dual-path component 4 is a roof prism with two roof faces 8, 9 that intersect along an elongate ridge 10 to form a reflective roof section. A recess is formed in the ridge 10 to define a triangular area 14 that is transparent to rays from the field of view in the object plane. The recess also defines a triangular bottom portion 14' which might be coated with a reflecting material to prevent transmission of source radiation that enters the illumination side 7.

Figure 6:
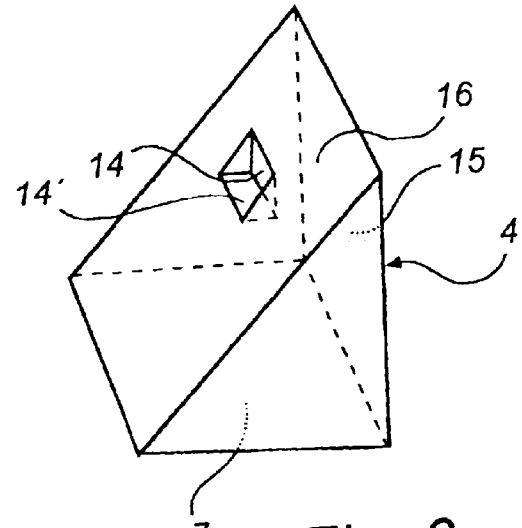
FIG. 6 is a perspective view of a second alternative embodiment of the optical component.

A second alternative embodiment of the invention comprises a dual-path component 4 according to FIG. 6 in the form of a right-angled prism with a recess in one side face 16. The side face is adapted to form a reflective surface to rays entering the illumination side 7 from the source and the object side 15 from the object plane. The recess defines a rectangular area 14 that is transparent to rays from the field of view in the object plane. The recess also defines a rectangular bottom portion 14' which might be coated with a reflecting material to prevent transmission of source radiation that enters the illumination side 7.

Figure 7B:
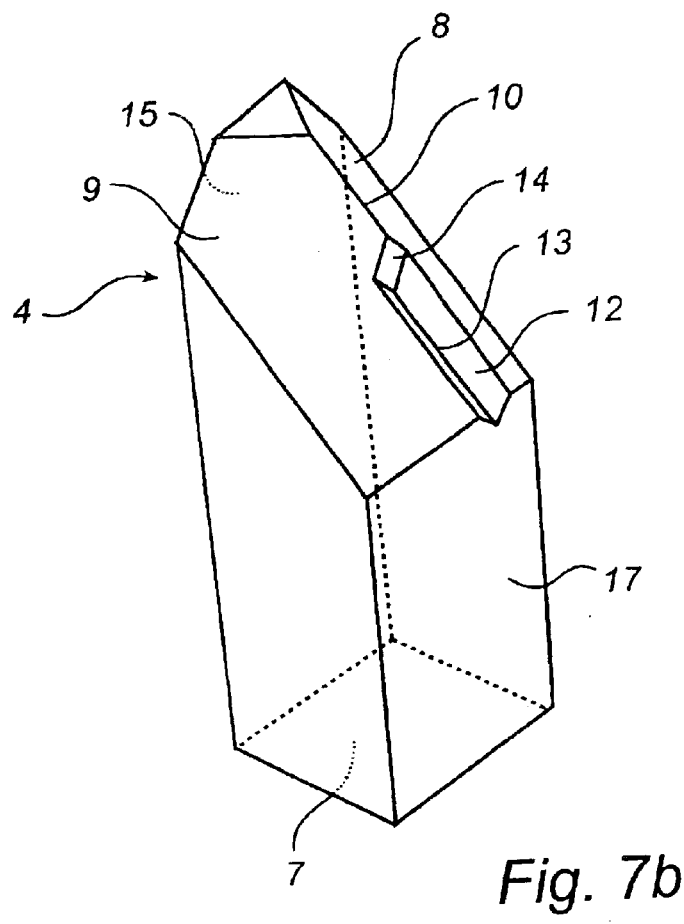
FIGS. 7a–7b are perspective views of modifications of the optical component in FIG. 4.
Figure 7A:
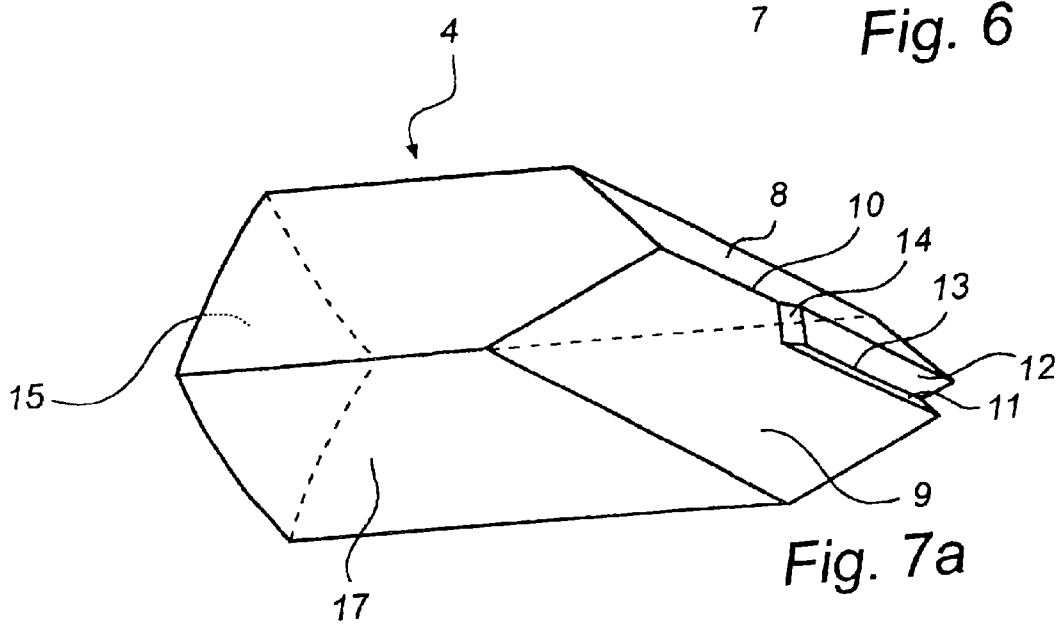

As a modification of the above embodiments, the dual-path component 4 may be provided with a light guide 17 on the object side 15, as illustrated in FIG. 7a, or on the illumination side 7, as illustrated in FIG. 7b, or on both sides (not shown). In the modifications shown in FIGS. 7a–7b, the light guide is rectangular in cross-section, but it is also possible to use a light guide which is, for example, triangular or hexagonal in cross-section.

The light guide 17 may serve any of several purposes. The light guide may be designed to level out the distribution of radiation over the illuminated area in the object plane. The light guide may also be used to diverge or converge the radiation from the source 1. A light guide on the illumination side 7 (FIG. 7b) may also result in an increase of the flexibility in the positioning of the source 1, which is placed at the end of this light guide. Thus, the source 1 can, without deteriorating the function of the optical system, be placed at any desired distance from the reflective surfaces in the dual-path component 4 if desired, for instance, for space reasons. Likewise, a light guide on the object side 15 (FIG. 7a) may allow the system to be designed with the object plane at any desired distance from the source 1 and the sensor 2. If the component 4 is to be arranged in a space which does not accommodate a straight light guide of a given length, such a length may be achieved by arranging light guides on both sides 7, 15 of the component 4.

As a further modification of the above embodiments, the object side 15 may be formed as a lens surface inclined to the optical axis A. This may prevent, or at least diminish, the amount of source radiation that may be retro-reflected in the boundary surface 15. Such retro-reflected source radiation may otherwise pass the area 14 and impinge on the sensor. Generally speaking, either one of the object side 15 and the illumination side 7, or both, can be formed as a refractive surface. Examples of such refractive surfaces are ordinary lens surfaces, which can be spherical or aspherical, Fresnel lenses, and diffractive surfaces. Also a plane surface which is inclined to the optical axis is in this context a refractive surface. The refractive surfaces in the object side 15 and/or the illumination side 7 can then be used, for instance, to replace one or more of any separate refractive elements normally present in the optical system.

As a still further modification of the above embodiments, the transparent window 4b, 14 of the dual-path component 4 may be provided with one or more refractive surfaces, such as lens surfaces. Thus, the transparent window 4b, 14 not only transmits radiation from the object plane, but also refracts the radiation in some controlled way. Such a modification has the potential of simplifying the imaging optics, as well as the assembly of the optical system.

In yet another variation of the above embodiments, the dual-path component 4 can embodied as a shell with a mirror surface which has a shape as in any one of the above embodiments. Such a component can be made of any suitable material, such as plastics, glass or metal, with a reflective coating forming the mirror surface. The reflective coating may be provided in a coating process and comprise, for instance, aluminum, silver, gold, a dielectric, etc. The transparent window 4b, 14 may be formed as a through-hole or a surface of transparent material with a suitable shape. Alternatively, the entire component 4 may be made of a reflecting material such as aluminum, with the transparent window 4b, 14 being provided as a through-hole in the reflecting material. The object side 15 and the illumination side 7, as well as any other non-reflective sides, are optionally not included in this variation, or are uncoated and made of a material which is transparent, i.e. non-diffusing.

Figure 8:
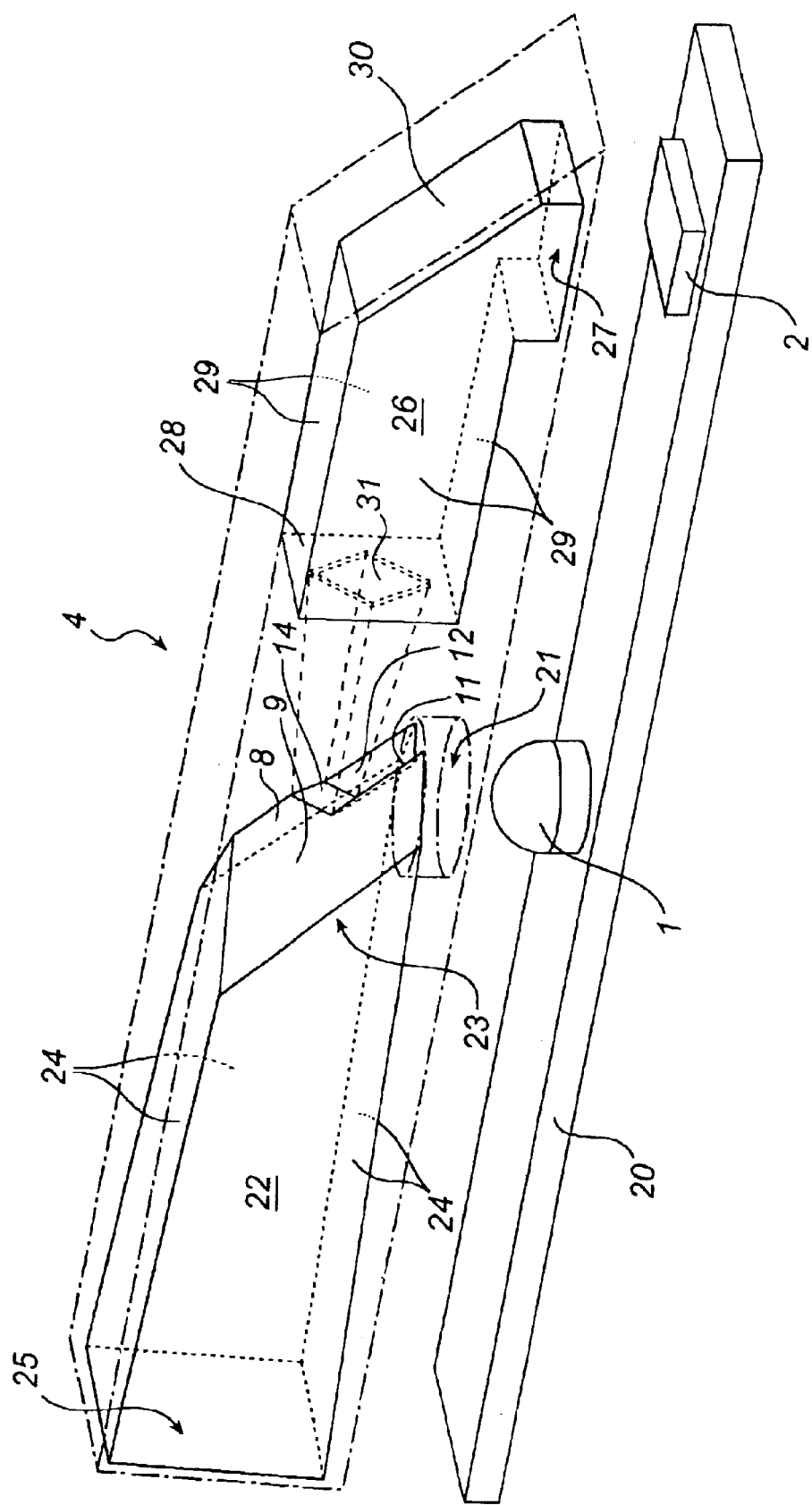
FIG. 8 is a perspective view of a third alternative embodiment of the optical component, wherein interior cavities of the component are illustrated by full lines.
Figure 9:
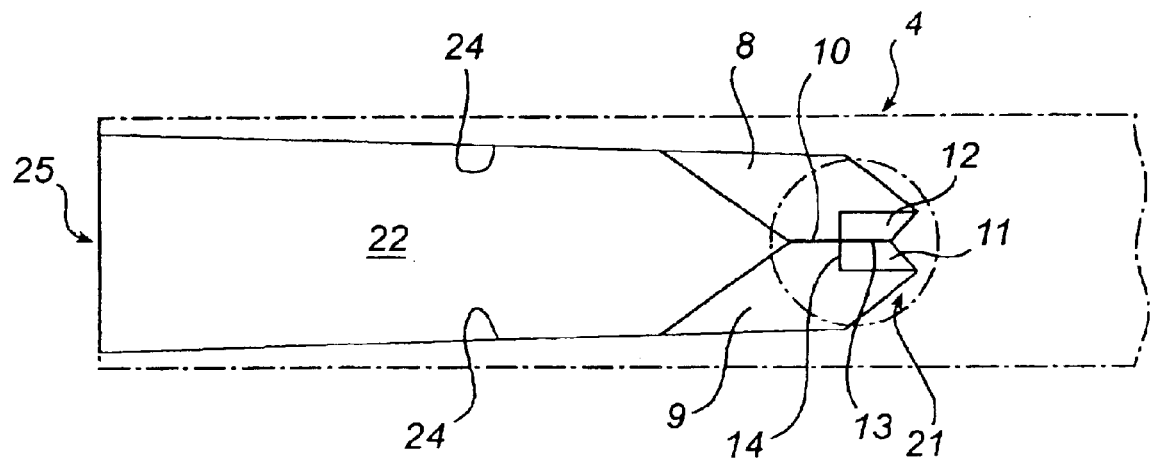
FIG. 9 is a bottom view of a front part of the component in FIG. 8, wherein a front cavity is indicated with full lines.
Figure 10:
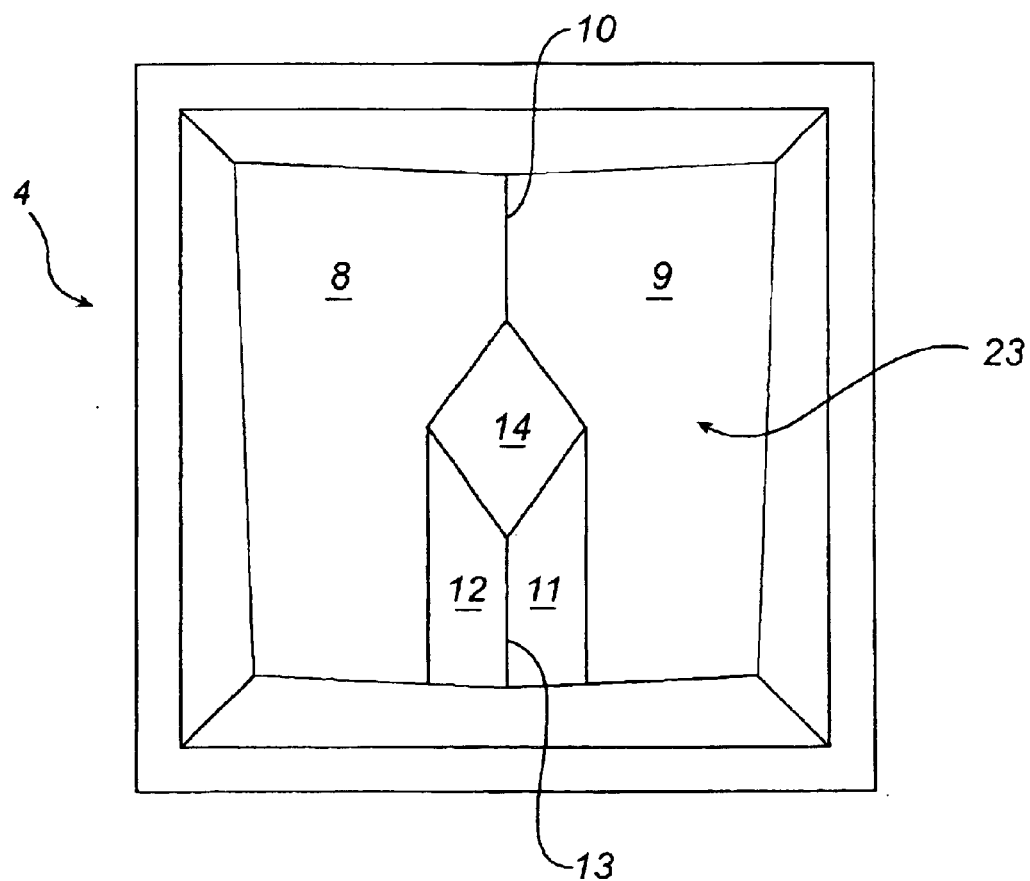
FIG. 10 is a front end view of the component in FIG. 8.

FIGS. 8–10 show a third alternative embodiment of the dual-path component, in which it is shaped as a shell. FIGS. 8–10 show the component in a perspective view, a front part bottom view and a front view, respectively, with the aim of illustrating the interior surfaces of the shell-shaped component 4. Thus, the body contour of the component is only outlined in chain lines, whereas the interior surfaces are indicated with full lines, or dotted lines when one interior surface is hidden behind another interior surface.

As indicated in FIG. 8, the dual-path component 4 is adapted to be fitted onto a printed circuit board (PCB) 20 which mounts a radiation source 1 in the form of a light-emitting diode (LED), and an area sensor 2, Thus, the component 4 and the PCB 20 form an optical system of the type shown in FIG. 3.

The component has a bottom side opening 21 which opens into an elongate front cavity 22 and is adapted to mate with the source 1. The front cavity 22 has a back wall 23 with reflective surfaces 8, 9, 11, 12 that form a mirror surface with an included transparent area 14. The mirror surface forms an angle of approximately 45° with the longitudinal center line of the cavity 22, which also coincides with optical axis of the system. Although the illustrated embodiment is based on the component layout of FIG. 4, the back wall 23 may have any suitable shape to achieve the desired function, for example as shown in FIGS. 5 and 6.

The front cavity 22 is further defined by elongate reflective side walls 24 which extend from the back wall 23 to an open front face 25, thereby defining a light guide. As shown more clearly in FIGS. 9 and 10, the side walls 24 are slightly inclined away from the longitudinal center line of the cavity 22 so as to form a light guide with gradually increasing cross-section towards the front face 25. Such a tapered light guide will serve to converge the diverging bundle of radiation as emitted by the source 1 and reflected by the back wall 23.

The front cavity 22 has the same function as the dual-path component of the above embodiments, i.e. to reflect radiation from the source 1 towards an object plane opposite to the front face 25 and to transmit radiation collected from the object plane through the transparent area 14. From FIGS. 9 and 10 it is clear that the reflective surfaces 8, 9, 11, 12 are arranged to be visible from both the entry opening 21 and the front face 25. Thus, radiation falling on these surfaces 8, 9, 11, 12 from the entry opening 21 or the front face 25 will be totally reflected. The transparent area 14, on the other hand, is arranged to be visible from the front face 25, so as to transmit radiation collected through the front face 25, and essentially hidden from view from the entry opening 21, so as to minimize direct transmission of source radiation.

The dual-path component of the third alternative embodiment of FIGS. 8–10 further has a back cavity 26 which is arranged in line with the front cavity 22. The back cavity 26 is adapted to receive radiation from the front cavity 22 and reflect this radiation towards a bottom side opening 27 which is shaped to mate with the sensor 2. The back cavity 26 is defined by a front wall 28, elongate side walls 29 and an inclined back wall 30. The front wall 28 is formed to transmit radiation from the front cavity 22 through a central transparent inlet area 31. The side walls 29 preferably has a low reflectivity to the received radiation, whereas the back wall 30 is highly reflective to such radiation. As indicated in FIG. 8, the transparent area 31 is formed as a lens surface which is adapted to image radiation from the object plane onto the sensor 2. For reasons of illustration, the distance between the first and second cavities 22, 26 is exaggerated in FIG. 8.

The dual-path component 4 according to the above embodiments may be manufactured by molding. The components of FIGS. 2–7 are suitably made from a material which is transparent to the radiation emitted by the source and captured from the object plane. The component of FIGS. 8–10 may also be made of such a material, if supplemented with a coating or insert of high reflectance on the back walls 23, 30 and on the side walls 24, and optionally a coating or insert of low transmission and low reflectance on the front wall 28 and on the side walls 29. Instead of using a coating or insert, the front wall 28 may be designed with an inherently non-transmissive shape, for example a shape similar to the shape of the back wall 23 of the front cavity 22 in FIG. 8. A transparent radiation path between the transparent areas 14, 31 is formed by the material itself.

According to an alternative, the component of FIGS. 8–10 is made of a radiation-blocking material. Then, there may only be a need for a coating or insert of high reflectance on the back walls 23, 30, and on the side walls 24. A transparent radiation path may be formed as a hollow channel extending between the transparent areas 14, 31.

According to another alternative, the component of FIGS. 8–10 is made of a reflecting material. Then, there may be a need for a coating of low reflectance on the side walls 29, and optionally on the front wall 28. A transparent radiation path may be formed as a hollow channel extending between the transparent areas 14, 31.

The invention has been described above in the form of a few exemplifying embodiments. However, the invention is in no way limited to these, but covers many other variants, according to what is defined by the scope of protection of the appended claims and, in addition, can easily be recognized by a person skilled in the art.

For example the mirror surface of the dual-path component may be of any shape, such as spherical, elliptic, hyperbolic, parabolic, faceted, etc. Likewise, the transparent window of the dual-path component may be of any shape, such as circular, elliptic, polygonal, etc.

Furthermore, the mirror surface of the dual-path component may be arranged at any suitable angle to the optical axis and the main direction of the source radiation, respectively.

The optical systems, the dual-path components and the methods for illuminating and imaging an object plane, as described hereinabove, may be used in a handheld device, such as an optical pen, a bar code or text scanner, a pointing device, etc. However, the invention may also find other applications, in particular when there is a need for a large depth of field and/or space-efficent design and/or efficent light-gathering ability, such as in devices for computer and machine vision, portable medical and scientific instrumentation, miniaturized cameras, etc.

What is claimed is:

1. An optical system arranged to illuminate an object plane and to transmit an image of the object plane to an image plane, said system comprising:
   an optical component that reflects first radiation, which is emitted by a radiation source, towards the object plane while also transmitting second radiation from the object plane towards the image plane,
   wherein the optical component comprises a reflective surface portion arranged to reflect the first radiation and a spatially separate transparent surface portion arranged to transmit the second radiation.

2. The optical system according to claim 1, wherein the reflective surface portion is arranged in surrounding relationship to the transparent surface portion.

3. The optical system according to claim 1, wherein the optical component is arranged with the transparent surface portion serving as a stop in the optical system.

4. The optical system according to claim 3, wherein the transparent surface portion serves as an aperture stop in the optical system.

5. The optical system according to claim 1, wherein the optical component is arranged to reflect the first radiation substantially concentric with the optical axis of the optical system to illuminate the object plane.

6. The optical system according to claim 1, wherein the transparent surface portion is arranged to be screened from the first radiation from the radiation source.

7. The optical system according to claim 6, wherein the transparent surface portion is positioned in a plane which is substantially parallel to the main direction of the first radiation from the radiation source.

8. The optical system according to claim 7, wherein said plane is arranged substantially perpendicular to the optical axis of the system.

9. The optical system according to claim 1, wherein the transparent surface portion is arranged to include an intersection between the optical axis of the optical system and a main direction of the first radiation.

10. The optical system according to claim 1, wherein the reflective surface portion comprises two reflective roof faces which intersect in a trench line to form a reflective roof section.

11. The optical system according to claim 10, wherein the transparent surface portion is formed in the reflective roof section along and around the trench line.

12. The optical system according to claim 10, wherein the reflective surface portion comprises two secondary reflective roof faces which intersect in a ridge to form part of the reflective roof section, the ridge being substantially aligned with the trench line and a transition between the trench line and the ridge defining the transparent surface portion.

13. The optical system according to claim 12, wherein the two secondary reflective roof faces intersect at a secondary roof angle which is in a range of about 45°–135°.

14. The optical system according to claim 13, wherein the secondary roof angle is substantially 90°.

15. The optical system according to claim 10, wherein the two roof faces intersect at a roof angle which is in a range of about 45°–135°.

16. The optical system according to claim 15, wherein the roof angle is substantially 90°.

17. The optical system according to claim 1, further comprising a light guide which is arranged to receive the first radiation from the radiation source.

18. The optical system according to claim 1, further comprising a light guide which is arranged to receive the first radiation from the reflective surface portion.

19. The optical system according to claim 17, wherein the light guide is rectangular in cross-section.

20. The optical system according to claim 1, wherein the optical component is in the shape of a shell.

21. The optical system according to claim 1, wherein the optical component is a prism.

22. The optical system according to claim 1, wherein at least part of the reflective surface portion is coated with a reflecting material.

23. The optical system according to claim 1, wherein the reflective surface portion is substantially totally reflective to the first radiation and the second radiation.

24. The optical system according to claim 1, wherein the optical component comprises a refractive surface which is arranged to receive the first radiation from the reflective surface portion.

25. The optical system according to claim 24, wherein the refractive surface is a lens surface which is inclined relative to the optical axis of the system and is adapted to prevent retro-reflection of the first radiation into the transparent surface portion.

26. The optical system according to claim 1, wherein the transparent surface portion includes a refractive surface, such as an imaging lens surface for collecting the second radiation from the object plane.

27. The optical system according to claim 1, wherein the radiation source is arranged substantially level with the image plane.

28. The optical system according to claim 27, which is interfaced with a printed-circuit board which mounts the radiation source and a two-dimensional radiation detector.

29. The optical system according to claim 5, wherein the optical axis is defined by the travel path of the second radiation from the object plane to the image plane.

30. A handler user unit for recording an image of an object, said handler user unit comprising the optical system according to claim 1.

31. An optical component comprising:
   a reflective surface portion adapted to reflect incident first radiation from a radiation source onto an object plane in an optical system, and
   a transparent surface portion which is spatially separate from the reflective surface portion and adapted to transmit second radiation from the object plane to an image plane of the optical system.

32. The optical component according to claim 31, wherein the reflective surface portion is arranged in surrounding relationship to the transparent surface portion.

33. The optical component according to claim 31, wherein the transparent surface portion is adapted to serve as a stop in the optical system.

34. The optical component according to claim 31, wherein the transparent surface portion is arranged to be screened from the incident first radiation.

35. The optical component according to claim 31, wherein at least part of the reflective surface portion is coated with a reflecting material.

36. The optical component according to claim 31, further comprising a light guide which is arranged to receive the first radiation from the radiation source.

37. The optical component according to claim 31, further comprising a light guide which is arranged to receive the first radiation from the reflective surface portion.

38. The optical component according to claim 31, which is a prism.

39. The optical component according to claim 31, which is in the shape of a shell.

40. A handheld user unit for recording an image of an object, said handheld user unit comprising the optical component according to claim 31.

41. An optical component, comprising:
a body which comprises:
an open front face;
a front cavity defined by an internal periphery wall portion which extends from the open front face to a back wall portion; and
an entry opening in the periphery wall portion adjacent to the back wall portion,
wherein the back wall portion comprises a reflective surface portion with a transparent surface portion therein, wherein first radiation entering the front cavity through the entry opening is reflected on the reflective surface portion towards the front face, and wherein second radiation entering the front cavity through the front face is transmitted through the transparent surface portion.

42. The optical component according to claim 41, wherein the reflective surface portion is arranged to be visible from the entry opening as well as from the front face, and wherein the transparent surface portion is arranged to be visible from the front face and substantially hidden from view from the entry opening.

43. The optical component according to claim 41, wherein the internal periphery wall portion is elongate and reflective to the first radiation so that the front cavity serves to guide the first radiation to the front face.

44. The optical component according to claim 41, wherein the entry opening is arranged to at least partly accommodate a radiation source.

45. The optical component according to claim 41, which includes a refractive surface arranged in line with the transparent surface portion.

46. The optical component according to claim 41, wherein said body further comprises a back cavity which is defined by a first end wall portion, a second end wall portion and a periphery wall portion extending between the first and second end wall portions, wherein an inlet for the second radiation from the front cavity is provided in the first end wall portion, wherein an outlet for the second radiation is provided in the periphery wall portion adjacent to the second end wall, and wherein the second end wall is reflective to the second radiation and inclined towards the outlet.

47. The optical component according to claim 46, wherein the outlet comprises a recess adapted to accommodate an image sensor.

48. The optical component according to claim 46, wherein the peripheral wall portion of the back cavity is substantially non-reflective to the second radiation.

49. The optical component according to claim 46, which is adapted for mounting on a printed-circuit board carrying the radiation source and an image sensor, so as to align the radiation source and the image sensor with the entry opening of the front cavity and the outlet of the back cavity, respectively.

50. The optical component according to claim 46, wherein the transparent surface portion comprises a hole which opens to a radiation duct extending to the inlet of the back cavity.

51. The optical component according to claim 46, wherein a radiation path is formed between the transparent surface portion and the inlet of the back cavity by a material that is transparent to the second radiation.

52. The optical component according to claim 46, wherein the body is made of a material that is transparent to the second radiation.

53. The optical component according to claim 46, wherein the first wall portion comprises a refractive surface which is aligned with the inlet and adapted to collect the second radiation from the object plane.

54. An optical system comprising:
radiation-emitting means, and
an optical component which directs incident first radiation from said radiation-emitting means to an object plane and transmits an image of second radiation from the object plane to an image plane,
wherein said optical component comprises means for reflecting the incident first radiation from said radiation-emitting means towards the object plane and means for transmitting second radiation from the object plane towards the image plane, said means for transmitting being spatially separate from said means for reflecting.

55. A method for illuminating an object plane and capturing an image thereof, comprising:
activating a radiation source to generate radiation, receiving at least part of the generated radiation on a stationary reflective surface portion and redirecting it by reflection towards the object plane, and
collecting second radiation from the object plane through a transparent surface portion which is physically connected to, but spatially separate from, the reflective surface portion, so as to form said image in an image plane.

56. An optical component, comprising:
means for reflecting incident first radiation from a radiation source onto an object plane in an optical system, and
means for transmitting second radiation from the object plane towards an image plane in the optical system,
wherein said means for transmitting is spatially separate from said means for reflecting.

* * * * *

UNITED STATES PATENT AND TRADEMARK OFFICE
CERTIFICATE OF CORRECTION

PATENT NO. : 6,927,916 B2
DATED : August 9, 2005
INVENTOR(S) : Thomas Craven-Bartle It is certified that error appears in the above-identified patent and that said Letters Patent is hereby corrected as shown below:

<u>Title page,</u>
Item [56], References Cited, U.S. PATENT DOCUMENTS, please add the following reference:
-- 6,438,396 B1    8/2002    Cook et al. --.

<u>Column 11,</u>
Line 17, claim 1 should read,
1. An optical system arranged to illuminate an object plane and to transmit an image of the object plane to an image plane, said system comprising:
an optical component that reflects first radiation, which is emitted by a radiation source, towards the object plane while also transmitting second radiation from the object plane towards the image plane,
wherein the optical component comprises a reflective surface portion arranged to reflect the first radiation and a spatially separate and non-coplanar transparent surface portion arranged to transmit the second radiation.

<u>Column 12,</u>
Line 54, claim 31 should read,
31. An optical component comprising:
a reflective surface portion adapted to reflect incident first radiation from a radiation source onto an object plane in an optical system, and
a transparent surface portion which is spatially separate and non-coplanar from the reflective surface portion and adapted to transmit second radiation from the object plane to an image plane of the optical system.

UNITED STATES PATENT AND TRADEMARK OFFICE
CERTIFICATE OF CORRECTION

PATENT NO. : 6,927,916 B2
DATED : August 9, 2005
INVENTOR(S) : Thomas Craven-Bartle It is certified that error appears in the above-identified patent and that said Letters Patent is hereby corrected as shown below:

<u>Column 14,</u>
Line 41, Claim 55 should read,
55. A method for illuminating an object plane and capturing an image thereof, comprising:
activating a radiation source to generate radiation, receiving at least part of the generated radiation on a stationary reflective surface portion and redirecting it by reflection towards the object plane, and
collecting second radiation from the object plane through a transparent surface portion which is physically connected to, but spatially separate and non-coplanar from, the reflective surface portion, so as to form said image in an image plane.

Signed and Sealed this

Eighteenth Day of October, 2005

JON W. DUDAS
*Director of the United States Patent and Trademark Office*